(12) United States Patent  (10) Patent No.: US 7,970,049 B2
Smith  (45) Date of Patent: Jun. 28, 2011

(54) METHOD AND APPARATUS FOR ENCODING VIDEO IN CONJUNCTION WITH A HOST PROCESSOR

(75) Inventor: Chris A. Smith, Santa Clara, CA (US)

(73) Assignee: Creative Technology Ltd, Singapore (SG)

( * ) Notice: Subject to any disclaimer, the term of this patent is extended or adjusted under 35 U.S.C. 154(b) by 1511 days.

(21) Appl. No.: 11/276,643

(22) Filed: Mar. 8, 2006

(65) Prior Publication Data

US 2006/0171689 A1 Aug. 3, 2006

Related U.S. Application Data

(63) Continuation-in-part of application No. 11/031,610, filed on Jan. 5, 2005.

(51) Int. Cl.
*H04B 1/66* (2006.01)
(52) U.S. Cl. ......... 375/240.01; 375/240.24; 375/240.02; 375/240; 382/232; 382/234; 382/237
(58) Field of Classification Search ............. 375/240.01, 375/240.24, 240.02, 240; 382/232, 234, 382/237
See application file for complete search history.

(56) References Cited

U.S. PATENT DOCUMENTS

| | | | | | |
|---|---|---|---|---|---|
| 5,926,226 | A | * | 7/1999 | Proctor et al. | 375/240.22 |
| 7,151,799 | B2 | * | 12/2006 | Kato et al. | 375/240.16 |
| 2002/0044201 | A1 | | 4/2002 | Alexander et al. | |
| 2002/0046404 | A1 | | 4/2002 | Mizutani | |
| 2002/0071485 | A1 | * | 6/2002 | Caglar et al. | 375/240.01 |
| 2003/0091325 | A1 | | 5/2003 | Estevez | |
| 2005/0184161 | A1 | | 8/2005 | Chen et al. | |
| 2005/0231586 | A1 | | 10/2005 | Rodman et al. | |
| 2006/0013416 | A1 | | 1/2006 | Truong et al. | |

* cited by examiner

*Primary Examiner* — Shawn An

(57) ABSTRACT

An external video device includes inputs for receiving an audio video signal from a source. The device includes in one enclosure audio and video processor portions configured such that the audio and video processors use a general purpose external bus for coupling electrical signals from the video device to a host computer. In one embodiment, the general purpose external bus is one of an IEEE-1394 bus or a USB bus. The general purpose external bus is used to transmit video from the host computer to the external video encoder and thereby to enhance the encoding efficiency.

17 Claims, 10 Drawing Sheets

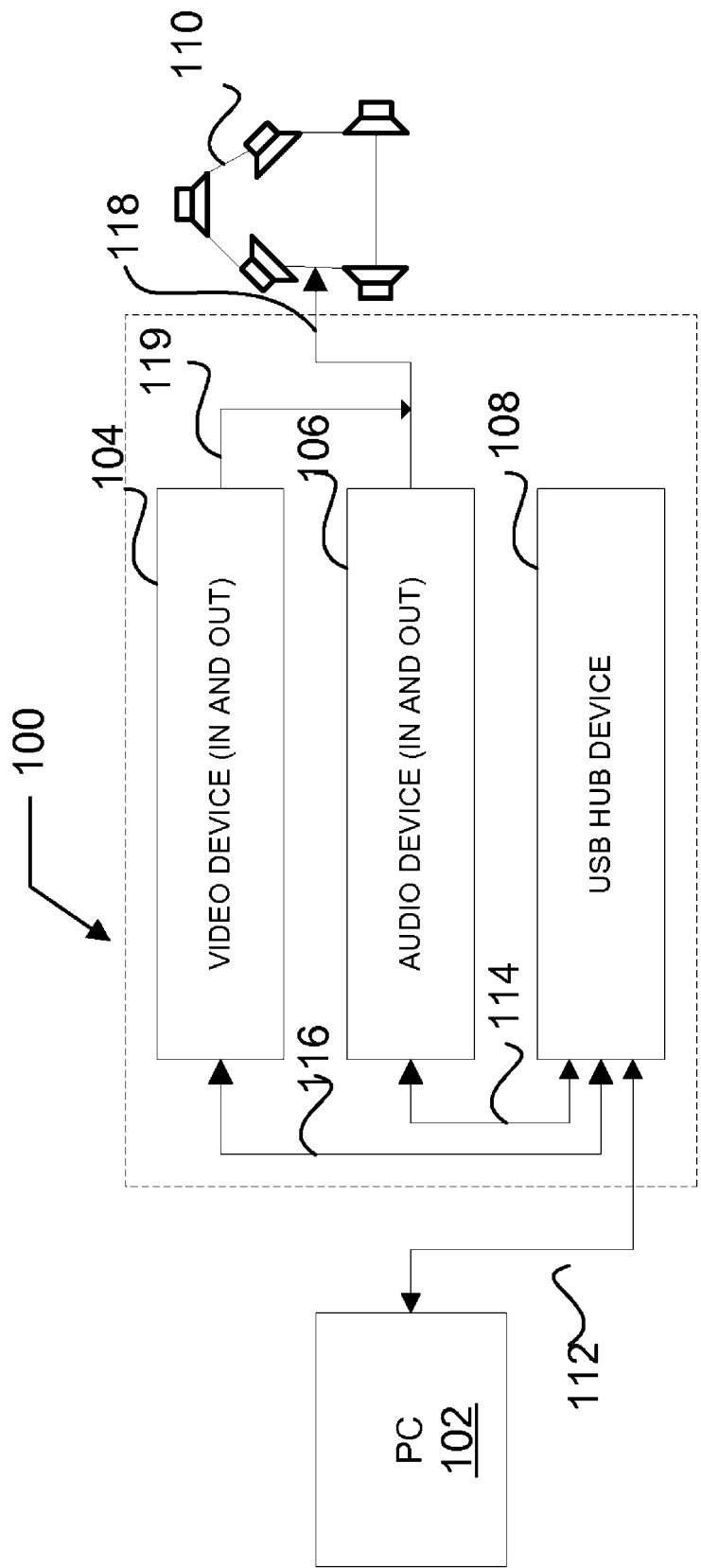
Fig._1

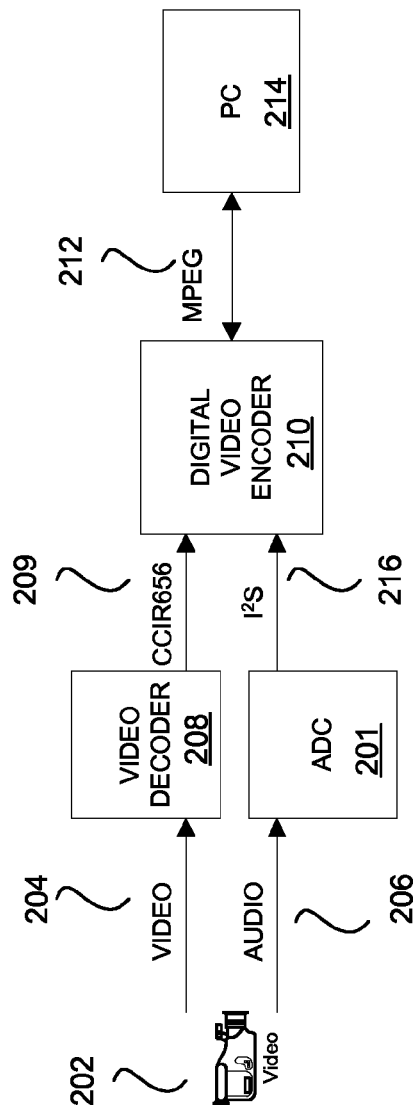
Fig._2A
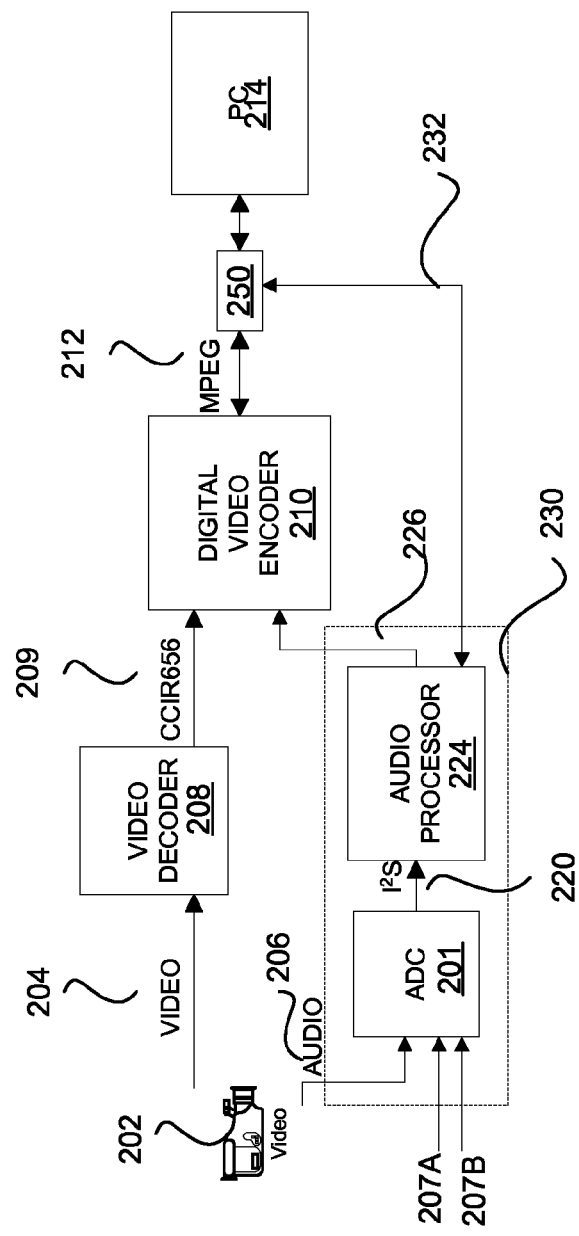
Fig._2B

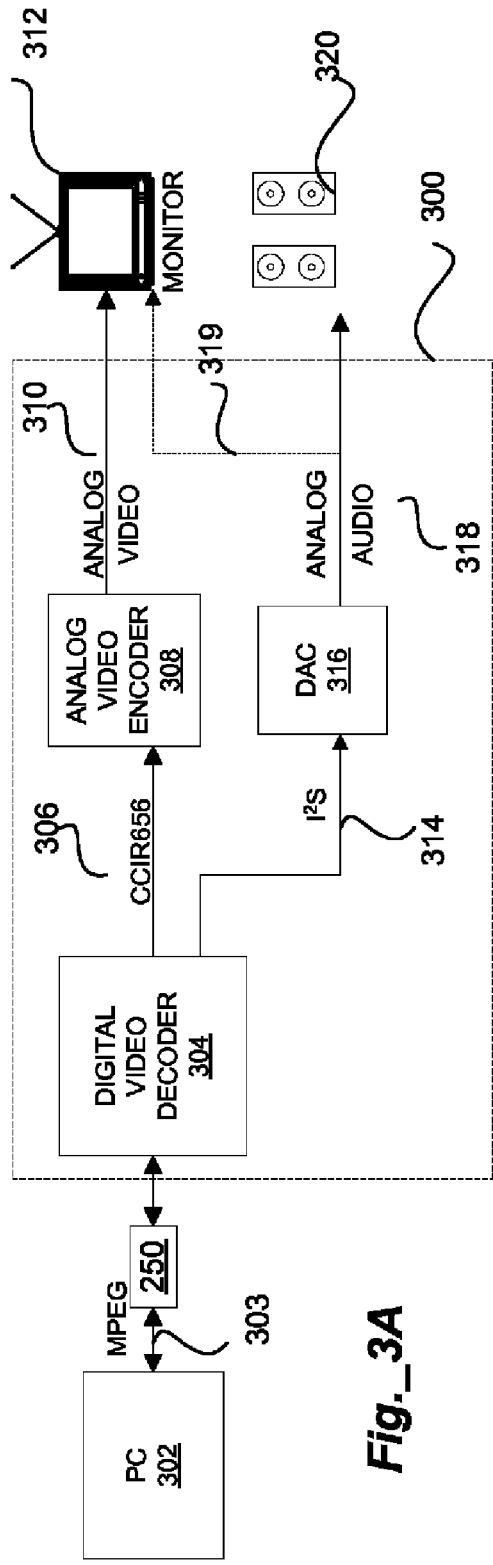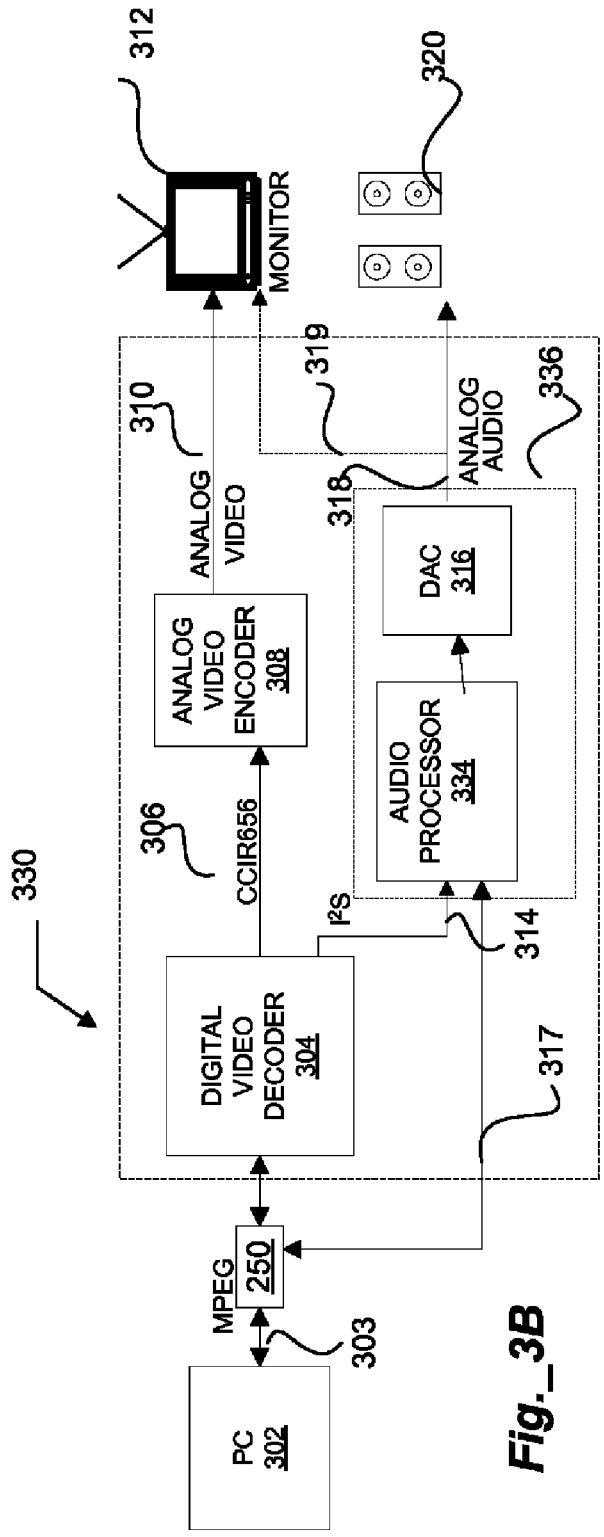

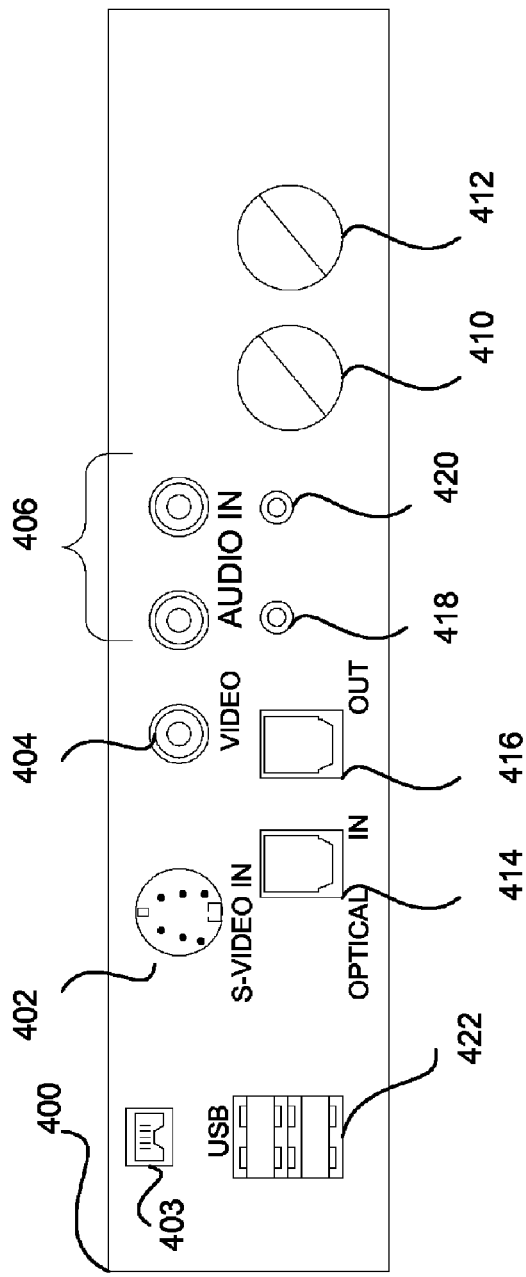
Fig._4A
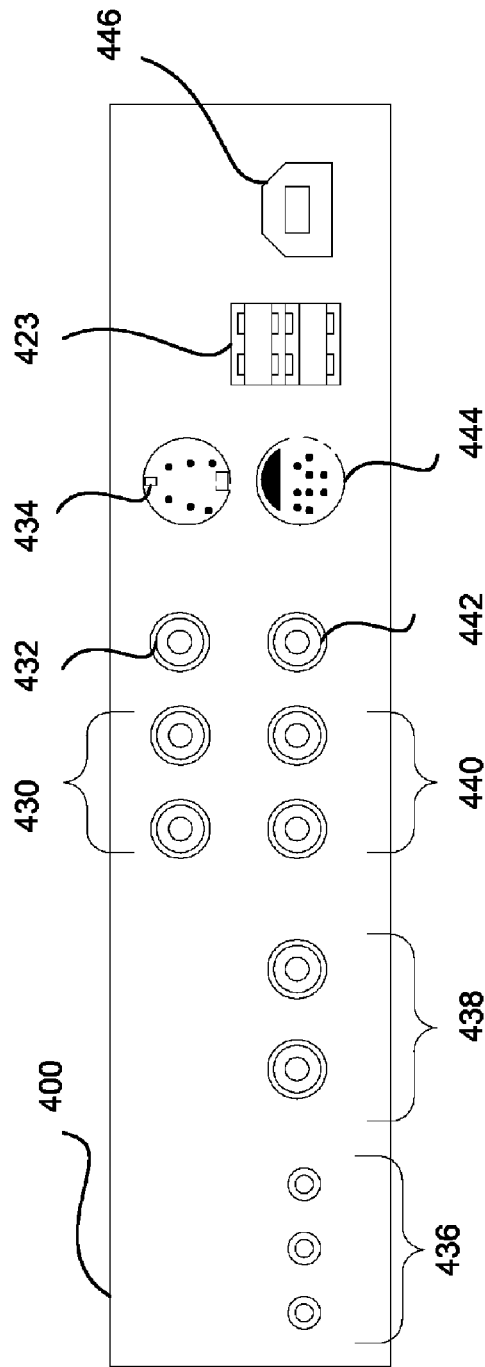
Fig._4B

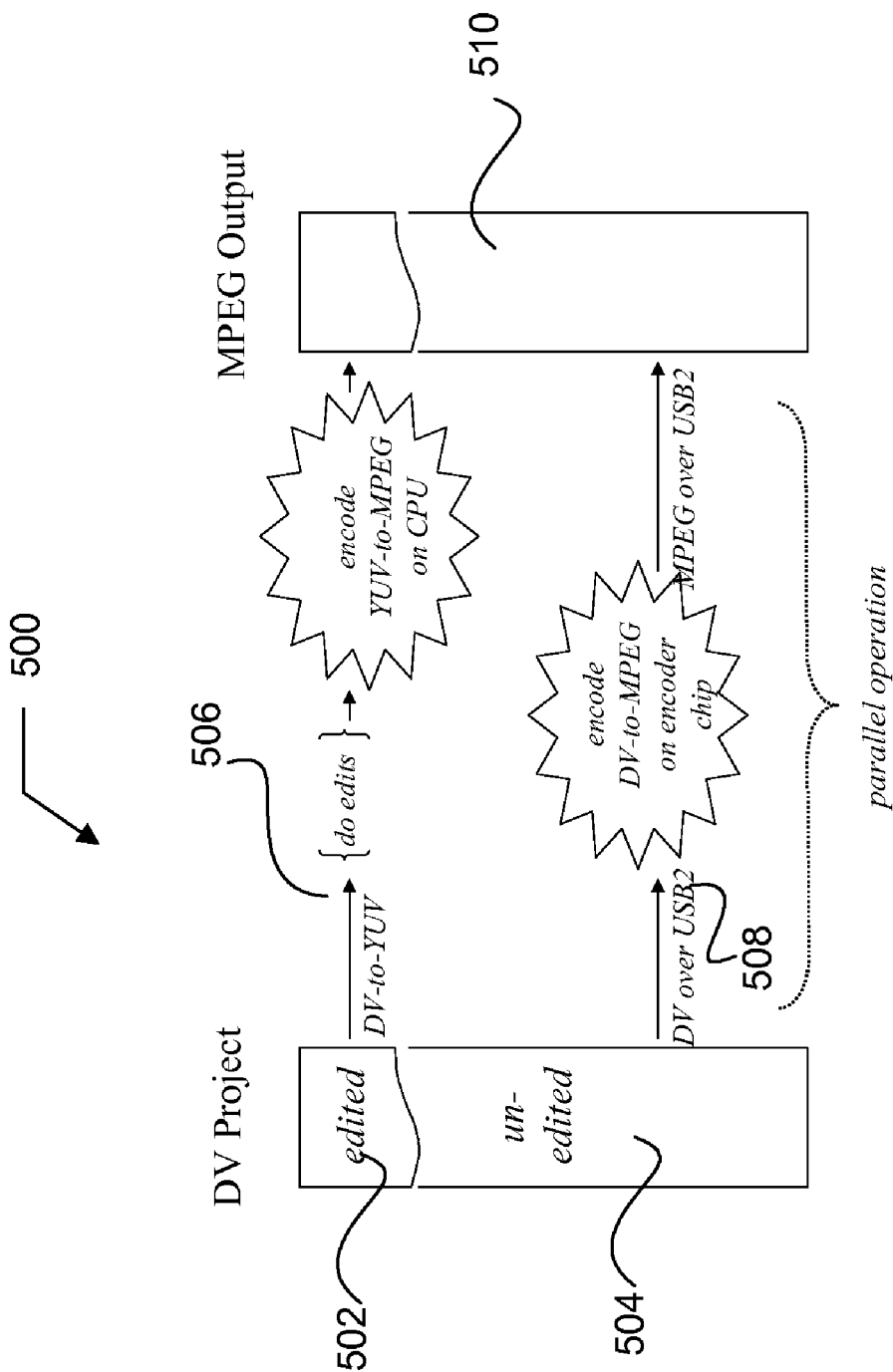
Fig._5A

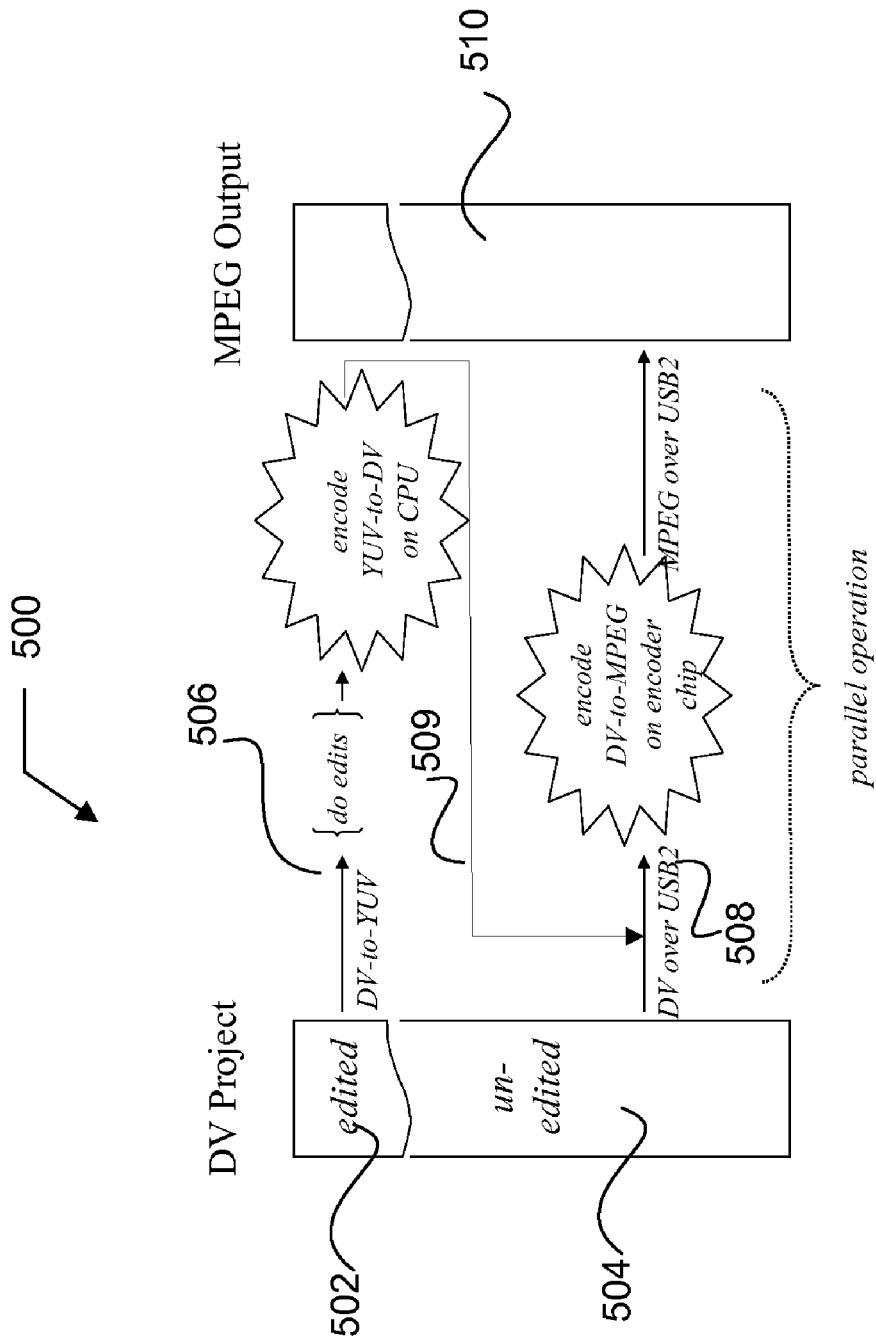
Fig._5B

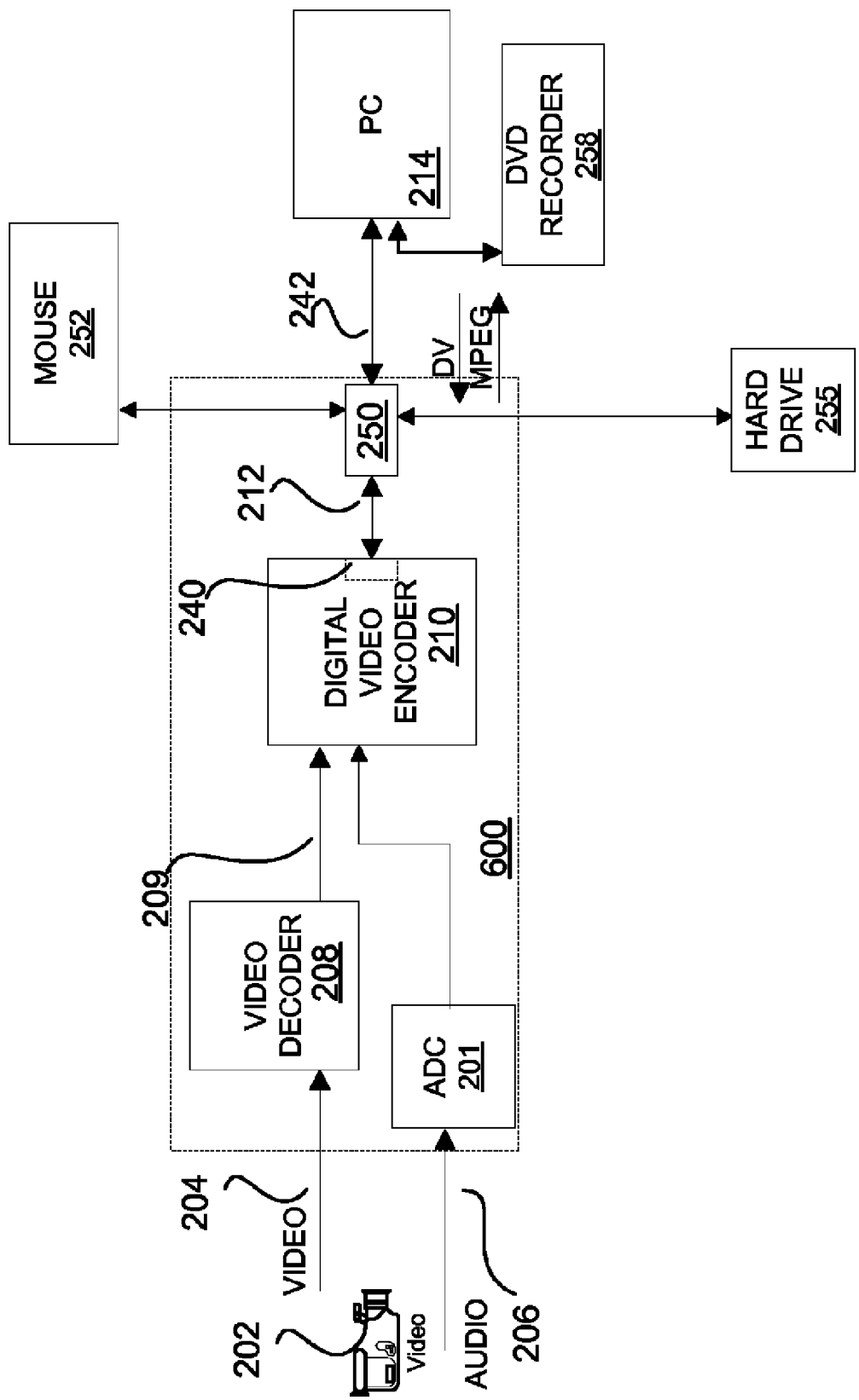
Fig._6

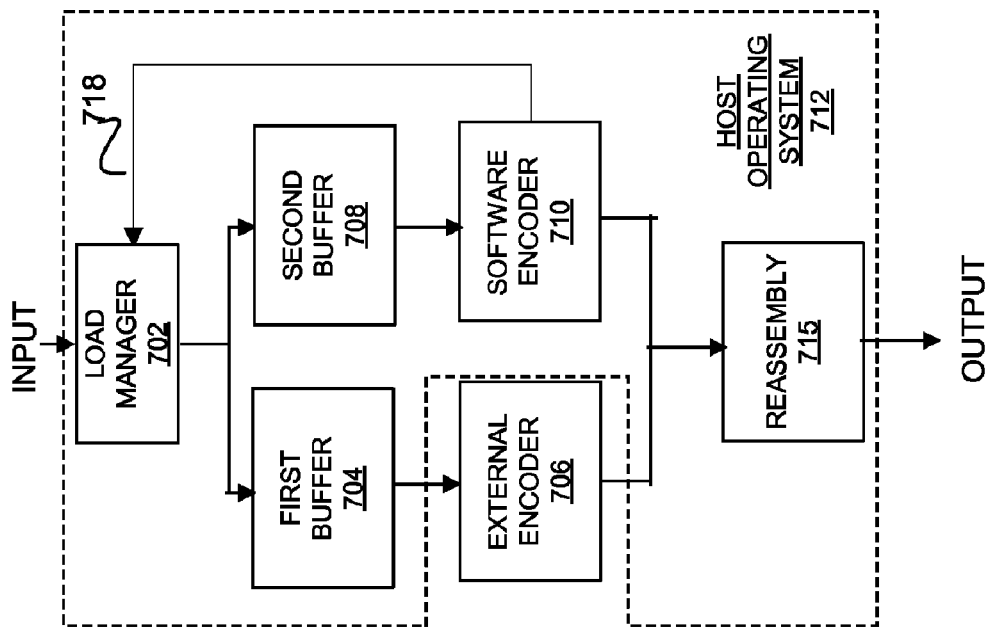
Fig._7B
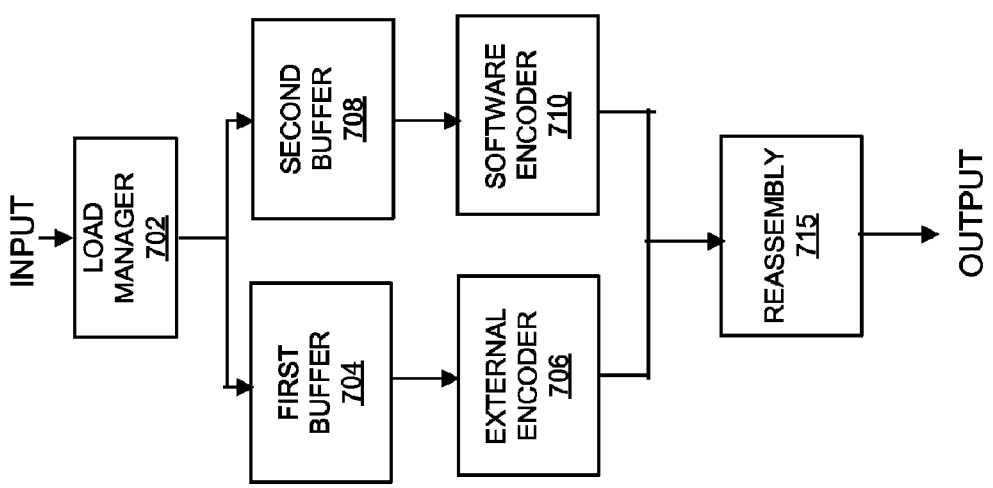
Fig._7A

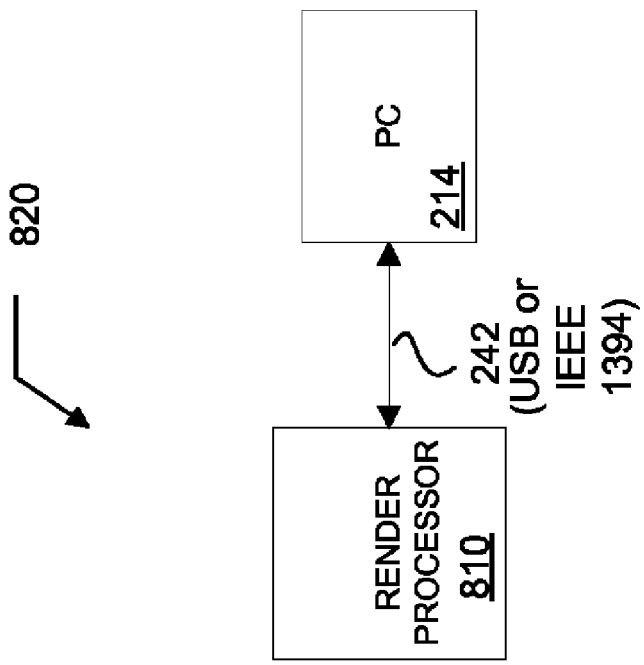
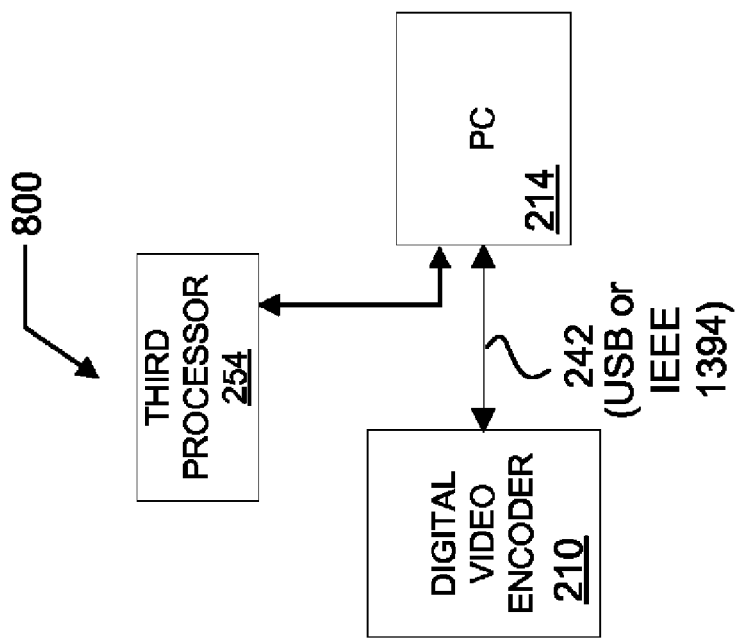
Fig._8B
Fig._8A

METHOD AND APPARATUS FOR ENCODING VIDEO IN CONJUNCTION WITH A HOST PROCESSOR

CROSS-REFERENCES TO RELATED APPLICATIONS

This application is a continuation in part of and claims the benefit of copending U.S. patent application Ser. No. 11/031,610, entitled COMBINED AUDIO/VIDEO/USB DEVICE, and filed on Jan. 5, 2005, the specification of which is incorporated by reference herein in its entirety for all purposes.

BACKGROUND OF THE INVENTION

1. Field of the Invention

The present invention relates to audio video products. More particularly, the present invention relates to methods for encoding video and audio in external processors connected with a host computer.

2. Description of the Related Art

With the advancements in imaging technology and increased computer processing power, much attention has been focused on the acquisition and processing of audio/video data in personal computers. Currently, video sources provide audio and video data in either or both of analog and digital formats. In order to facilitate the processing of video signals by computers, video boards having image acquisition capabilities are used.

These boards may be internal or external to the PC and typically accept a video signal in either an analog or digital format and transmit the signal in a digitally encoded format to the computer. Analog signals, in particular, require conversion to a digital format and in many cases compression before the data is transmitted to the host computer. Analog video signals are typically organized into frames. In the United States and other compatible countries NTSC signals are transmitted typically at 30 frames or 60 fields per second. In other parts of the world, for example in PAL systems, the video signals are transmitted at 25 frames or 50 fields per second. An analog to digital converter (ADC) digitizes the incoming video and audio signal in response to synchronization information embedded in the analog video signal.

The resulting digitized frame samples are temporarily stored in a frame acquisition buffer and then transferred to the computer system memory for further processing. In contrast, a digital video source (e.g., a digital camcorder) provides a digital video signal to the video board via the digital video port. Since the digital video signal already comprises a stream of digitized video frames, the ADC on the video board is bypassed and the digitized frame data is forwarded directly to the frame acquisition buffer in the board.

In both cases, the data is available to the host computer processor via a communications cable. The communications cable may be an internal bus or an external bus. Further, it may be compressed in a standard format, such as MPEG, before transmission to the host computer. The audio signal is also converted where necessary to digital formats and stored in a synchronized manner with the stored digital video data frames.

With the increase in processor speeds available in consumer PC's, consumer non-linear video editing applications have become more prevalent. Non-linear video editing refers to the process of editing a video file by converting the video to a series of video segments that can be accessed in a non-linear (e.g., random) manner. Typically the video signal and its various video segments are stored in a digitized form on a hard disk. The edited video is then reassembled by accessing the selected video segments as well as effects, and transitions.

Often, video capture boards are add-in boards available for insertion into an internal bus of a PC. In some cases, the video capture add-in board is available as a peripheral, connected to the PC over an external bus. External busses such as the Universal Serial Bus (USB) and/or the IEEE-1394 Bus are increasingly found on consumer PC's.

Video editing typically involves high speed busses and high capacity storage. Raw video significantly increases the demands on the busses and storage in comparison to compressed video. Hence, most video captured is compressed, i.e., encoded before the digitized video is transmitted to the host computer for editing.

DV-25 is a common compression format used for video. This format involves intra-frame compression which makes it especially suitable for many editing applications. Unfortunately, the DV format is not a common consumer distribution format. Typically, videos are distributed in any of several MPEG formats. For example, the VCD format employs an MPEG-1 compression scheme and enjoys popularity in many parts of the world, especially Asia. MPEG-2 provides an even higher resolution and even greater popularity when stored on optical DVD's (Digital Versatile Disks). Accordingly, many consumers have a desire to convert edited video in the DV-25 format into one or more consumer distributable formats.

Even with the availability of increased PC processor speeds, the process of transcoding, i.e., converting the videos from one compression format (e.g., DV-25) to another (e.g., any of the MPEG formats), is both a time consuming and a processor intensive task, typically performed in a software encoder in the host computer.

It is therefore desirable to provide an improved device for transcoding video from one video format to another.

SUMMARY OF THE INVENTION

The present invention provides an external video device combining audio and video processing and an external general purpose bus. A variety of audio and video input ports are provided for receiving a signal from a video or audio video source. A variety of audio video combined feed through/processed signal output ports are also provided. A single communications cable, i.e., a general purpose external bus such as a USB cable, is further provided to transmit the digitized audio video data to the attached host computer and to receive signals from the computer. In one embodiment, the signals from the host computer comprise video signals for transcoding. According to another embodiment, an integrated USB hub is provided in the combined audio video card.

In accordance with a first embodiment, an external audio video device for coupling to a host computer is provided. The device includes a video processor configured for receiving an encoded video signal in a first encoded format from a host computer and transcoding the video signal to a second encoded format. In one embodiment, the first encoded signal is a video signal encoded in the DV-25 format and the second encoded signal is one of the MPEG-1, 2, or 4 formats.

According to another embodiment, a video signal is received by the video device. The video signal is either a digitized video signal or is converted from an analog audio video input signal to a digitized video signal through the external video device's video capture capabilities. The digitized video signal is then transmitted to the host computer over an external bus such as USB or IEEE-1394. The device also preferably includes an audio processor configured to convert an analog audio signal to a digitized audio signal and to prove audio enhancements to the digitized audio signal. Further, the device is configured and coupled over a general purpose external bus with a host computer. The host computer is configured to share video rendering operations including video encoding using the video render processor in the external video device.

The device is configured to provide audio enhancements to at least one of a plurality of audio input signals. In one embodiment, at least one of the plurality of audio input signals comprises an audio signal received at the input ports of the device and digitized if the signal is analog. In accordance with another embodiment, at least one of the plurality of audio input signals is transmitted from an audio video source such as a camcorder. The audio video signal is digitized to generate a digitized audio signal portion corresponding to the input audio video signal provided to the device.

According to one embodiment, S-video, composite, and DV inputs are provided. S-video, composite, and DV outputs are also provided. According to one embodiment, digital outputs such as TOSLINK optical connections or SPDIF coaxial connections are also provided. The USB connection permits a single USB communications line to transmit and receive processed and unprocessed audio, video, and control information (data) with the attached host computer. By providing a common audio output connection, a combined group of speakers may be used for many applications, such as for music, gaming, and video monitoring (the audio portion).

In accordance with one embodiment, a combined audio video device is included in a system for processing video data. The system includes a host computer and an external video render processor. The external video render processor is coupled to the host computer by a general purpose external bus. Both the host and the external video render processor are configured to transmit video data in a bi-directional manner between the host computer and the external video render processor over the general-purpose external bus. The video data is transmitted from a video file to the external video render processor for processing and transmitted back to the host computer after processing.

In one embodiment, the external video render processor is configured to perform video encoding. In another embodiment, the external bus is one of a USB bus and an IEEE 1394 bus.

In accordance with yet another embodiment, a method for enhancing the encoding of a video file is provided. A first segment of a video file is provided to an external video encoder coupled to a host computer over a general purpose external bus for encoding the first segment. A second segment is directed to a software encoder loaded in the host computer for encoding the second segment. The host computer is preferably configured to receive the encoded first segment at the host computer and to merge the encoded first and second segments. In one variation, the external bus is one of a USB bus and an IEEE 1394 bus.

These and other features and advantages of the present invention are described below with reference to the drawings.

BRIEF DESCRIPTION OF THE DRAWINGS

FIG. 1 is a diagram illustrating a combined audio, video, USB device in accordance with one embodiment of the present invention.

FIG. 2A is a diagram illustrating a circuit configuration for a combined audio video device in accordance with one embodiment of the present invention.

FIG. 2B is a diagram illustrating a circuit configuration for a combined audio video device in accordance with one embodiment of the present invention.

FIG. 3A is a diagram illustrating a circuit configuration for a combined audio video device in accordance with one embodiment of the present invention.

FIG. 3B is a diagram illustrating a circuit configuration for a combined audio video device in accordance with one embodiment of the present invention.

FIGS. 4A-B are diagrams respectively illustrating front and rear panels of an exemplary combined audio video device in accordance with one embodiment of the present invention.

FIGS. 5A and 5B are diagrams illustrating methods of parallel encoding in accordance with one embodiment of the present invention.

FIG. 6 is a diagram illustrating a circuit configuration for a system enabling the encoding of video in an external video processor in conjunction with a host processor.

FIGS. 7A-B include system diagrams employing different techniques for adjusting the encoding loads between the hardware and software encoders, in accordance with embodiments of the present invention.

FIG. 8A is a system diagram illustrating external video processing enhancement in accordance with one embodiment of the present invention.

FIG. 8B is a system diagram illustrating external video processing enhancement in accordance with another embodiment of the present invention.

DETAILED DESCRIPTION OF PREFERRED EMBODIMENTS

Figure 2C:
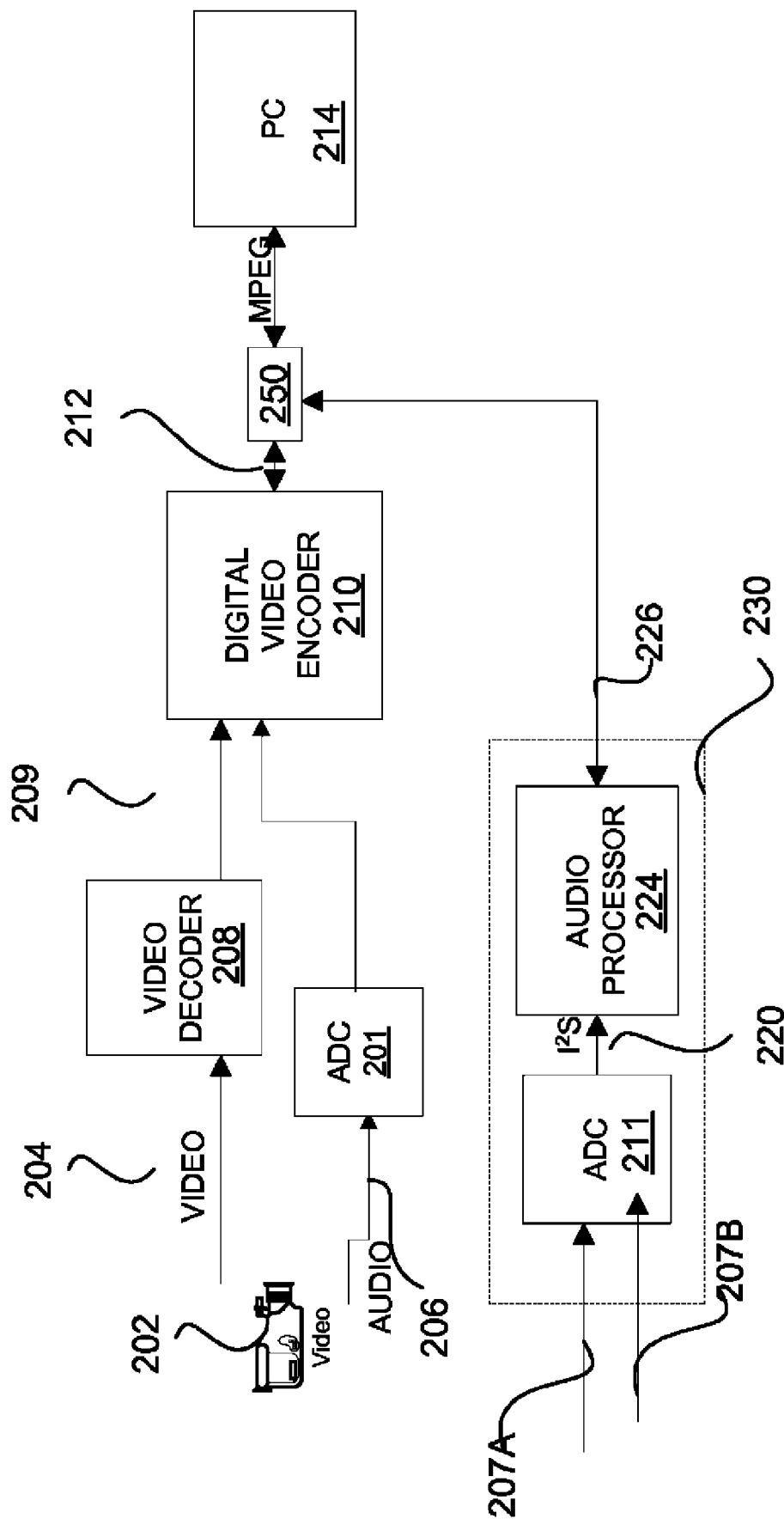
FIG. 2C is a diagram illustrating a circuit configuration for a combined audio video device in accordance with one embodiment of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits its incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

In one embodiment of the present invention, a combined audio, video, and USB hub is provided. The video capture portion enables capturing of analog or digital video from a peripheral device, such as a camcorder. The video captured is transferred in a digital stream for storage on a hard drive of a host computer. The digitized video may then be accessed randomly and edited. Editing may take any form to include adding special effects such as for example animation and adding titles.

Most conventional host computers are configurable with software for video editing. However, most such computers do not have either analog video inputs or outputs. Typically, separate video capture cards or devices are used to capture and record video from camcorders or other video sources. Hardware and/or software compression (codecs) are employed to reduce the size/bitrate of the digitized video prior to storage on the host device. For example, one common digitized and compressed format is MPEG-2.

Adapter cards having DV or IEEE1394 connectors (firewire) are also used to import digital video streams from digital camcorders. These typically are cards having edge connectors configured for insertion into matching PCI slots accessible from the exterior of host computers. Many laptop and desktop PC computers do not have built in DV connectors. Moreover, notebook computers are not generally compatible with PCI add-on cards.

While both video capture cards (or boards) and audio cards are available in an external form and having USB compatibility for communication via a USB cable to the host computer, providing separate external devices requires multiple communications cables for connection to the host computer. Moreover, communication between the video module and the audio module in such a configuration requires signals to be routed via the host computer. By combining the audio and video modules onto one device external to the host computer, and further incorporating a USB hub, communications between the audio and video modules can be more efficiently achieved.

FIG. 1 is a diagram illustrating a combined audio, video, USB device in accordance with one embodiment of the present invention. In particular, the efficiency achieved by using common connections and communications cables is illustrated. The combined audio, video, USB device 100 is preferably configured such that the video portion 104 and the audio portion 106 communicate with a host computer 102 via a single USB cable 112. That is, USB device 108 is a USB hub, having at least one USB input port and at least one USB output port for connecting external devices. Further, the USB hub 108 is preferably configured with internal ports for connection with the video portion 104 and the audio portion 108. That is, bi-directional communication is provided between the USB hub 108 and each of the video device 104 and the audio device (portion) 106, respectively by internal connections 114 and 116. In this way, communications between each of the video 104 and audio 106 portions with the host computer 102 may be made over a single USB cable. That is, the USB hub device acts as a bi-directional repeater/router for signals having their source or destination in the video processor portion, audio processor portion, or PC host computer. The USB hub device 108 preferably complies with at least the USB 1.1 specification, and more preferably the USB 2.0 specification, thus providing bandwidth of up to 480 Mb/sec. The USB hub device may be bus powered or more preferably self powered for more stable USB device power management.

The video capture portion 104 is preferably configured to accept input video signals and generate output video signals using a variety of connectors. For example, the combined AV USB device 100 is preferably configured with composite video, S-video (Y/C), component video (YCrCb), and DV (IEEE1394) connectors for providing a video signal from a video source such as a camcorder. Likewise, the combined audio video USB (AV USB) device is also configured with a variety of output video connectors for monitoring a signal, such as one directly from the video portion 104 of the combined AV-USB device or from the host computer 102 via the USB cable 112. For clarity of illustration, the input and output connectors (other than USB lines and the common audio output monitoring line) are not shown. Since those of skill in the relevant arts are familiar with the input and output connectors described, further illustration details are believed unnecessary here.

The combined configuration also provides efficiency in connectivity to monitoring speakers. For example, common cable line 118 may be used for connecting to a loudspeaker system 110, such as stereo speakers or a 5.1 speaker system. Thus, for example, only one pair of RCA connectors are required to provide connectivity to monitor the audio portion of a video signal (such as might be generated from a video card) or from an audio processor 106. In particular, audio 119 from the video portion may be coupled directly to the audio portion signal over line 118. In a first embodiment, the video portion preferably provides video capture capabilities from analog video signals as well as pass through capabilities for digital video signals.

FIG. 2A is a diagram illustrating a circuit configuration for a combined audio video device in accordance with one embodiment of the present invention. This diagram focuses on the operation of the device to process in a conventional manner an audio video signal without using the audio enhancement capabilities of an audio processor configured in the same housing. In the case of an analog video signal from a video source 202 (e.g., a camcorder), the analog video signal 204 initially undergoes conversion to a digitized form in the video decoder module 208 of the combined AV device. The signal 209 transmitted from the output of the video decoder 208 is preferably in any standard digital video format, for example, a digitized format compliant with ITU-656. ITU-656 is a digital component interface (also known as CCIR-656). It defines a coding for component video sometimes abbreviated as YCrCb. Next, the signal 209 is directed to a digital video encoder module 210, for conversion to a compressed format. As illustrated, the audio portion from the camcorder 206 is preferably routed in this embodiment through a separate audio ADC conversion module 201 to provide a digital audio signal. Preferably, the digital audio signal generated by the conversion is in an $I^2S$ format, for later processing by the digital video encoder 210. The digital video encoder 210 synchronizes the digital audio and video signals for generation of a compressed digital output signal 212, preferably in one embodiment, compliant with the MPEG standard, e.g., MPEG-1 or MPEG-2. The synchronized digital (MPEG) signal 212 is then forwarded to the host computer 214, preferably using USB connectivity cables, and preferably over a USB hub (not shown). FIG. 1 illustrates the interconnectivity and functioning of the USB hub relative to the video device, audio device, and the host PC, and therefore further details will not be provided here. The digital video encoder preferably is configured to pass MPEG-1, MPEG-2 or DV across the USB to the PC. More preferably, the digital video encoder 210 is configured to also transmit other digital formats, including MPEG-4, WMV, and other digital formats that gain acceptance in the future.

FIG. 2B is a diagram illustrating a circuit configuration for a combined audio video device in accordance with one embodiment of the present invention. In this embodiment, enhanced audio processing is performed on the combined audio video device before the separate digitized audio and video signals are recombined and compressed for transmission to a host computer. Initially, the audio 206 and video 204 signals from the video source 202 are processed separately. As illustrated in FIG. 2A and described above, the video signal is first forwarded to a video decoder 208 to generate a digitized video signal 209, for example having an ITU-656 format, before recombination with a synchronized digitized and enhanced audio signal 226 in the digital video encoder 210. The analog audio signal 206 is first converted to a digital audio signal 220 (e.g., I$^2$S) in ADC (i.e., analog to digital converter) module 201. Next, the digitized audio signal 220 is enhanced by audio processor 224. The variety of audio enhancements are numerous and well known to those of skill in the relevant arts, and thus will not be described in full detail here. Examples include, however, noise removal, upmixing of two-channel audio to a 5.1 audio signal, adding reverberation, gain control, mono-to-stereo conversion, and sound shaping in general. Next, this audio enhanced digital signal 226 is combined with the digital video signal 209 in a synchronized manner in the digital video encoder 210. As with the configuration illustrated in FIG. 2A, an encoded stream 212 is transmitted to the host computer 214. The encoded stream 212 is preferably compressed to comply with MPEG or DV formats, however the scope of the invention is not so limiting. The encoded stream may be processed by any suitable CODECS, for example, including without limitation MPEG-4, WMV, WMA, DivX (a particular MPEG-4 based codec), etc. This configuration allows the audio processing circuitry 230 to be shared for "sound card" type audio enhancement functions (e.g. listening to or recording music, or playing video games or other types of audio received over independent audio inputs 207) and for processing the audio portions 206 of synchronized audio video signals, such as might be generated by camcorders. Preferably, the device provides video and audio over a single connection or cable 212, for example a USB cable, in a bi-directional manner with the host computer. This minimizes the number of cables necessary for operation. Thus, communication with the host computer may be effectuated for storage or playback, preferably with the ability to have communication in both directions at the same time. Although the combined digital audio and video may be synchronized and transmitted to the host computer using an uncompressed format, preferably the combined signal is compressed in the device into a DV or MPEG stream for efficient use of the bandwidth provided by the transmission line to the host computer. For example, signals compressed in accordance with the DV format may requires bandwidths of 25 Mbps whereas MPEG signals require bandwidths from 1.0 to 9.5 Mbps. for this type of product.

The enhanced audio functionality may be performed real-time during video capture and encoding without burdening the host computer or causing extra processing steps for the host computer. Specifically, as video/audio is captured, the audio is signal-processed in real-time through the audio chip on the audio processor board in order to provide extra capabilities while permitting the digital video encoder chip to dedicate itself to video encoding. Preferably, the audio processor board enhancements are performed in high fidelity. Digital video encoder chips provide only limited audio processing capabilities and are incapable of providing any high fidelity enhancements. In this embodiment, the processed audio is fed back into the digital video encoder and becomes part of the encoded stream sent to the PC. More particularly, the digital video encoder preferably takes the uncompressed (but enhanced) digital audio and converts and compresses it to MPEG Audio, Dolby Digital or LPCM—then MUXes it in with the video to create the encoded stream sent to the PC.

The scope of the invention is intended to extend to any audio processing effect, for example, including but not limited to noise removal, upmix to 5.1, downmixing, filtering, sound spatialization, sound expansion, reverberation effects or other sound shaping. In particular, the combined hardware preferably is configured to provide a DVD-compliant MPEG stream with surround sound (5.1) audio encoded in Dolby Digital or DTS during the real-time video capture process without burdening the PC.

Alternatively, as video/audio is captured, the audio can be mixed in real-time with other sources of audio that are inputted to the audio processor board (e.g. real-time voiceover from a microphone at microphone port 207B). The combined audio thus becomes the digital audio that is encoded as part of the MPEG stream sent to the PC.

Independent audio inputs are preferably provided to the audio processor 224 using audio inputs 207A (line in) and 207B (microphone). Accordingly, the audio processing circuitry 230 and the audio processor 224 in particular may perform typical sound card functions. For example, audio enhancement may be added to the audio signals such as from a DVD, CD recording, or radio or TV recording. The audio processor is coupled to the host computer 214 in a bidirectional manner over line 232, preferably using USB hub 250. Due to this configuration, audio emanating from a video game or other source on the host computer can be enhanced and monitored using the audio processor 224. The audio processor can, according to this configuration or any of the configurations described, also augment the host computer's editing capabilities. For example, the audio processor chip can be used to provide hardware assistance for audio operations during editing and rendering. That is, the software in the host computer may be configured to send audio over the USB cable to the device and use the capabilities of the audio chip on the audio processor board to accelerate audio operations such as: audio filters (EQ or noise removal), upmix, environments or (re)compression. In a similar manner, the video processor chip may be used to accelerate recompression during video editing and rendering operations assigned to the host computer. For example, the software may be configured to send video over USB to the device and use the capabilities of the video encoder chip on the video board to accelerate video operations such as compression into MPEG. Alternatively, the accelerated operation may be a video filtration operation, e.g. color adjustment, rescaling, video transition, etc. Further details regarding hardware accelerated rendering are illustrated in FIGS. 5-6, and discussed later in this specification.

FIG. 2C is a diagram illustrating a circuit configuration for a combined audio video device in accordance with one embodiment of the present invention. In this embodiment, the audio signal 206 (from the audio video signal) is processed separately from the audio processing circuitry 230. That is, the audio processing circuitry 230 is not used to process the signal 206, but rather performs typical sound enhancement functions found on separate sound cards on separate (independent) audio signals. These enhancements are as described above and preferably include at least one of filtering, sound expansion, sound spatialization, mixing, upmixing, downmixing, 3D spatialization, noise reduction, and reverberation. The audio input 207A is preferably a conventional audio analog input (line in) such as from a DVD, CD recording, or radio or TV recording whereas input 207B is a microphone input for recording human voice or other live sources. The latter input may be used to provide a "voiceover" capability to a video recording. FIG. 2C further differs from the embodiment depicted in FIG. 2B in that the output of the audio processor 224, i.e., signal 226 is routed directly to the USB hub 250, for transmission to the host computer 214.

FIG. 3A is a diagram illustrating a circuit configuration for a combined audio video device in accordance with one embodiment of the present invention. This embodiment illustrates use of the combined audio video (AV) device 300 for monitoring of a video signal transmitted from a host computer 302. Initially, the compressed video signal 303 (e.g., an MPEG or DV formatted signal) is directed to the AV device. Preferably, communication between the host computer 302 and the AV device is over a USB communications link, and preferably using USB hub 250. Alternatively, the communication may be implemented over other communications links, for example over a DV (i.e., IEEE 1394) connection.

Initially, the compressed video signal is directed to a digital video encoder/decoder 304 for decompression and decoding. Preferably, the decoder transmits at its output ports a separate digitized video (e.g., ITU-656) signal 306 and a digitized audio signal 314 (e.g., an $I^2S$ formatted signal). The digitized video signal 306 is then directed to an analog video encoder 308 for conversion of the digital video signal to an analog video signal 310, for processing and display by monitor 312. This signal is compatible with analog input connectors found on monitors. Simultaneously, the digital audio signal 314 is converted to analog format in DAC ("digital to analog converter") 316. The analog audio output signal 318 is transmitted from the output of the DAC 316 to a suitable speaker system 320 for monitoring and/or playback.

FIG. 3B is a diagram illustrating a circuit configuration for a combined audio video device in accordance with another embodiment of the present invention. By routing the digitized audio video (AV) signal from the host computer (preferably through a USB hub 250) and decoding it, audio enhancement may be performed on the audio portion in real-time. As illustrated in FIG. 3A and discussed above, the digitized signal 303 from the host computer 302 is fed into the digital video encoder/decoder 304 of the AV device 330. The video signal is then processed in the same manner as illustrated in FIG. 3A and described above. That is, the video signal 306 is converted to analog and to a format compatible with the video inputs of the monitor 312. Simultaneously, the digital audio signal 314 is processed by an audio processor 334, followed by digital to analog conversion in DAC ("digital to analog converter") 316. The audio processor may be configured to perform any audio enhancement, such as including those described above. For example, these enhancements may include noise removal, upmixing of two-channel audio to a 5.1 audio signal, adding reverberation, gain control, mono-to-stereo conversion, and sound shaping in general. The analog audio signal 318 available at the output of the DAC module 316 is then transmitted to the speaker system 320 for playback or monitoring. Optionally, the analog audio signal may be routed by link 319 to a loudspeaker or other audio playback device at the monitor 312. Separate audio signals 317 from the host computer may be routed directly to the audio processor 334. These include, for example, audio signals form MP3 files played back on the host computer. These audio signals may be enhanced using audio processor to provide any sound enhancements typically provided above, including but not limited to those described above with reference to FIGS. 1-3. In this configuration, the audio processing circuitry 336 performs a dual function: enhanced processing of audio portions of AV ("audio-video) signals and separate processing (i.e., enhancement) of audio signals, e.g., for gaming or music playback or other suitable applications. It is to be understood that the functional operation of the audio video USB device has been described and illustrated particularly in FIGS. 1-3 to show different operational modes. It is to be appreciated that preferably all or selected combinations of these modes are to be incorporated in the combined device, thus providing a single device in a single enclosure having a common power line and a common connection (USB hub and cable) with a host computer. Thus, for example, the PC (the host computer) has been illustrated in the different operating modes with different reference numbers for clarity of illustration. It is to be appreciated that preferably a single host computer is connected over a single USB hub contained within the device in a bi-directional manner, thus providing digitized audio to the host computer and receiving from the host computer digitized audio for enhancement in the combined device's audio and/or video processors. Further illustrative details of one embodiment of the combined device are described with reference to FIG. 4.

FIGS. 4A-B are diagrams respectively illustrating front and rear panels of an exemplary combined audio video device in accordance with one embodiment of the present invention. In FIG. 4A, a sample front panel of the combined device 400 is shown. The exemplary combined device 400 includes optical (e.g., TOSLINK) input and output connections 414 and 416 for digital audio. Further, composite video 404 and audio 406 inputs as well as S-video inputs 402 are included. A DV input/output port 403 provides communication to DV devices using an IEEE 1394 connection. Stereo audio line input jacks 418 and 420 are also illustrated (the stereo line inputs are on the back (440); these are Headphone output (418) and microphone input (420) jacks are also illustrated. Controls 410 and 412 are provided for providing respectively the microphone input volume control and output "Master" volume control. As discussed above, the combined audio-video and USB device preferably in one embodiment includes a USB hub. Two USB ports 422 are shown on the front panel.

In FIG. 4B, a sample rear panel of the combined device 400 is shown. A plurality of line out connectors 436 are included. Further, pairs of stereo RCA connectors are provided for stereo line out 438 and stereo line in 440 capabilities. In addition, composite audio and video connectors 430, 432 or S-video 434 provide video output and audio output functions, such as for example during the monitoring illustrated in FIG. 3 and discussed above, or to output video and audio to a camcorder or VCR. Digital audio output may also be provided over SPDIF connector 442. Further USB ports 423 as well as a USB "B" type connector 446 are provided respectively for adding USB compatible peripherals and communicating with the host computer.

FIG. 5A is a diagram illustrating a method of parallel encoding in accordance with one embodiment of the present invention. DV is a compressed video format often chosen for video editing because of its intra-frame compression. Though suitable for editing, it is not a mass-distributed consumer format. Typically consumers will want to encode video in an MPEG format and record ("burn") the edited content onto a removable media. For example, DVD's store video content in an MPEG-2 format whereas Video CD's (VCD's) store video content in an MPEG-1 format. MPEG-4 is gaining in popularity and can be expected to find wide application in the future. Currently, MPEG-4 compressed files are often "packaged" in DIVX formatted files (container files).

Non-linear editing allows video segments (clips) to be accessed in a random manner. In desktop video editing (consumer video editing), the video segments are preferably stored in compressed digital formats such as DV-25 (DV) and stored on a storage medium that allows random access. Hard disks are ideal for this but other storage mediums also provide random access. For example, CD's, DVD's, and flash memory are all examples of media that can facilitate video editing. A video-editing project will often include additional source material such as features and transitions as well as the video segments. Once the final edited video is generated, it can be recorded onto DVD-ROM or CD-ROM or other known media variations.

In accordance with the embodiment illustrated in FIG. 5, the DV Project 500 is the result of a user's video editing of one or more video segments which are stored on a computer in DV-25 format. The diagram illustrates a method wherein the operation of "rendering" the project, namely performing the user's edits and also transcoding the project into MPEG, can be accomplished on multiple processors operating in parallel.

The DV Project 500 includes frames that are edited 502 as well as unedited frames 504 that may be interspersed throughout the project. In the preferred embodiment, a parallel encoding operation is performed. That is, the host computer's software encoder processes a first group of frames 502. The external hardware encoder preferably processes a second group of frames 504. The edited frames 502 are preferably processed by the host computer's software encoder due to the details of the frame editing process. In one embodiment, the editing software non-destructively stores the editing operations in an edit list, then applies the editing changes during rendering. Edits of the cut-paste variety, i.e., cutting a group of frames from one section of the video stream and inserting them in another, do not modify the contents of individual frames and thus cut-and-pasted frames can be considered as unedited frames.

In contrast, other edit operations require the frame contents to be modified and hence demand greater processing resources. For example (i) transitions, (ii) title overlays, (iii) motion menu items, and (iv) video filters all require conversion of the compressed frame before the video operations can be completed. That is, each frame must first be expanded to a raw YUV frame before the edit operation can be performed (see branch 506), then converted to its final form.

In a preferred embodiment, none of the edited frames are processed (transcoded) in the external hardware encoder. In a more preferred embodiment, only unedited frames and frames wherein the editing is limited to a cut-and-paste operation are directed to the external video encoder for processing. It should be understood that the scope of the invention is intended to extend to all combinations of distributing the video encoding load between the software video encoder configured in the host computer and the external video encoder. Because YUV-to-MPEG or YUV-to-DV rendering demands significant USB or other external bus bandwidth, the preferred embodiment performs these operations in the host computer's software video encoder. Hence, the DV Project 500 illustrated in FIG. 5A includes a parallel operation involving a first parallel branch 506 wherein the edited frames 502 are converted to YUV, edits performed, and then encoded preferably to an MPEG format in the software video encoder. It should be noted that this example refers to conversion to YUV or raw YUV. This is intended to be illustrative and not limiting. Some methods and products decode to other color spaces, for example RGB, and the scope of the invention is intended to embrace all variations of the color space.

In the second parallel branch 508 the "turbo rendering" process is performed. That is, the host computer and the external video encoder are configured to share the video encoding load. This is advantageous in (1) releasing the host computer's processor to perform other tasks; (2) increasing the speed of the video transcoding operation; or (3) a combination of (1) and (2). In order to perform the external video transcoding, the selected video clips or frames are directed over the external bus (e.g., USB or IEEE 1394) to the video encoder chip, encoded in MPEG, and directed back to the host computer's processor over the same external bus. The external bus permits bi-directional transfer of video data between the host computer and the external video processor. Finally, in the host computer the separate collections of frames are rejoined 510 to reconstruct the edited video clips that comprise the project. These frames have now been preferably rendered in a consumer distributable format such as MPEG.

In another embodiment, the edited frames may first be converted to DV. The DV Project 500 illustrated in FIG. 5B includes a parallel operation involving a first parallel branch 506 wherein the edited frames 502 are converted to YUV, edits performed, and then encoded preferably to a DV format in the software video encoder. As illustrated in FIG. 5B, these edited frames can then be sent to the external video processor, for example, along branch 509, thus sending all frames in the project to the external video encoder. In an alternative embodiment, these frames can be distributed between the software encoder and the external video processor, more preferably using the load management techniques as will be described with respect to FIGS. 7A and 7B.

Preferably the external bus is capable of high bandwidth. More preferably, the external bus would comply with the USB 2.0 or IEEE 1394 specification. As known to those of skill in the relevant arts, the USB 2.0 and IEEE 1394 specifications provide effective bandwidths of 480 Mb/sec and 400 Mb/sec respectively, more than suitable for transferring DV-25 and MPEG streams at the same time over the same external bus. Further, future external busses are expected to provide even greater speeds. For example, the IEEE-1394B specification permits effective speeds up to 800 Mb/sec.

Software applications performing video editing and rendering are known to those of skill in the relevant arts and hence complete details will not be provided herein. For example, Ulead Video Studio, commercially available from Ulead Systems of Taiwan is one such example. Software applications enabling a user to record ("burn") an MPEG formatted video stream onto removable media are also well known. One such example is DVD Movie Factory, also distributed by Ulead Systems.

In one embodiment, the video editing system is configured with a control section to manage the loads between the software video encoder and the external hardware video encoder, and further to reassemble the edited and transcoded video clips. The scope of the invention is intended to extend to any suitable location for the control section, e.g., configured in the external device, in hardware in the host computer, or in software in the host computer. In one preferred embodiment control is provided in a software application running on the host computer. In one particular embodiment, the software application running on the host computer is further configured to manage the loads between two parallel processing branches 506 and 508 illustrated in FIG. 5.

FIG. 6 is a diagram illustrating a circuit configuration for a system enabling the encoding of video in an external video processor in conjunction with a host processor. The host processor 214 is preferably configured to transmit the compressed video (such as DV) over the general purpose external bus 242 (e.g., USB) to the USB hub 250 for distribution to the external bus interface portion 240 of the digital video encoder 210, for example over bus 212. This is one embodiment where a hub is integrated into the external video board 600. The digital video encoder 210 is preferably configured to both transmit and receive video signals at its external bus interface 240. Other means of providing control and switching of bidirectional video streams between a chip such as a video chip and an external bus are known in the relevant arts and hence the present invention is intended to embrace all such variations. In preferred embodiments, the external bus 242 is a standardized high-speed serial connection bus providing input/output (I/O) connectivity between the host PC and its computer peripheral devices. Both the USB and IEEE 1394 external busses are high-speed serial I/O busses for computer peripherals and consumer electronics devices and are used in embodiments of the present invention. Each enjoys broad market acceptance. For example, most new PC's come equipped with at least one Universal Serial Bus port or connector.

In one embodiment, the external bus is configured to enable support for multiple peripheral devices simultaneously while facilitating bi-directional video data transfer for sharing video encoding loads. More preferably, the external bus is a high speed bus enabling the bi-directional transfer of data at speeds from as little as 10 Mbps to in excess of 400 Mbps. For example, in transcoding from MPEG1 to MPEG4, a bandwidth of approximately 10 Mbps would be sufficient. For transcoding for the DV-to-MPEG case, an approximate bandwidth of 35 Mbps would be required. More preferably still, the external bus is a serial protocol bus allowing automatic recognition of attached peripherals by the host computer and its operating system. Illustrative examples include both USB and IEEE 1394 which support multiple peripheral devices simultaneously. For example, USB has proliferated as an external connection bus for peripheral devices such as scanners, printers, digital cameras, video cameras, portable audio players, DVD recorders and external hard drives. IEEE 1394 provides connectivity to a wide variety of peripheral devices as well, including digital video cameras, and hard drives. Both hi speed USB and IEEE 1394 busses co-exist on many consumer PC systems. As illustrated in FIG. 6, a hard drive 255, mouse 252, and DVD recorder 258 are coupled to the host computer 214 over the external bus 242 or its hub 250.

By configuring the video editing system to use such external busses for the bi-directional transfer of video data for encoding, the turbo rendering techniques described herein maybe brought to consumers at a low cost. Both the USB and IEEE 1394 serial transfer protocols have other characteristics that make them especially suitable for use in the video editing embodiments described herein. Both provide easy connectivity to the host computer. That is, each allows a relatively simple cable to provide connectivity between the peripheral device and the host computer. Further, upon connection of the peripheral device to the external bus, automatic device detection and installation occurs. That is, devices (such as video cameras, hard drives, external DVD recorders) may be "hot swapped", i.e., added or removed from the computer while it is running.

Both busses support multiple peripheral devices simultaneously. For example, the USB protocol supports up to 128 devices simultaneously whereas the IEEE 1394 serial protocol supports up to 64 devices. Hence, in one or more embodiments, the same external bus providing connectivity between the external video encoder and the host computer may also be used to provide control and data communication to other devices such as a video camera, DVD recorder, and external hard drive, thereby greatly simplifying the connectivity requirements for the video editing system.

Both the USB and the IEEE 1394 busses are capable of providing power to the peripheral devices described. Operating systems currently found on most PC's are capable of supporting USB and IEEE 1394 busses. Each bus enables portable devices such as including digital video cameras and external hard drives to be quickly and easily connected to the host computer, thus facilitating transfers of audio video data from a digital still camera or video camera to the host computer.

Hence, systems with external busses such as 1394/USB can use those busses for multiple purposes, in many cases simultaneously with video functions. For example, compressed video may be transmitted into the PC over USB while simultaneously playing a DVD movie on the PC, including transmitting digital audio going back out to the device 300 (see FIG. 3A) over the USB cable 303 for playback over the speakers 320. This provides versatility not present in external busses dedicated to high-bandwidth video.

Those of skill in the relevant arts, given the guidance provided by this specification, can be expected to implement the bi-directional data flow between the host computer and the video encoder with minimal experimentation. For example, data flow between the USB hub (or other external bus) and the video encoder positioned on the external video device can be implemented using a series of muxes or other comparable logic circuitry to permit a video encoder to receive DV compressed frames at its input and to transmit the MPEG encoded frames at its output to the bus in a time multiplexed fashion. For example, one video encoder chip having such capabilities includes the DMN 8600 Series video processors, manufactured by LSI Logic Corporation of Milpitas, Calif. The USB hub 250 in FIG. 6 is intended to illustrative and not limiting. That is, external busses are known that do not integrate hubs. Hence, the scope of the invention is intended to extend to all variations of external busses, whether or not hubs are required or even permitted for connecting multiple peripheral devices.

While the above discussion has focused on video transcoding, it should be understood that video formats also typically include audio data. Hence, in a preferred embodiment, both the host computer and the external device are configured to perform audio encoding operations. Since video operations including encoding require substantially higher bandwidths as compared to audio encoding operations, decisions to perform encoding in the external device, in software running on the host computer, or in some combination of the two will be dictated by the demands of the video operations.

The turbo rendering load management may comprise any combination of load sharing between the host computer's software video encoder and the external hardware video encoder. That is, the scope of the invention is intended to extend to systems performing the video transcoding entirely on the external hardware video encoder, entirely by the host computer's software video encoder, or any combination of load sharing that involves simultaneous video encoding or other video processing operations.

In one embodiment, the host computer or external processor is configured to distribute the processing load of the video encoding. For example, an algorithm may be designed to distribute the processing load of the video encoding across the two processors in such a fashion that the overall operation has one or more characteristics depending on how the algorithm is set, including any combination of:

(1) sending all video encoding to the external hardware video encoder while operating the host computer in parallel to perform "other" video operations that will speed up the overall rendering operation (Examples of "other" video operations include performing video edit operations, reassembling segments of encoded video, muxing audio and video together, creating a DVD disc image, writing ("burning") to an optical drive and/or finalizing the burning of an optical disc.);

(2) sending all video encoding to the external hardware video encoder while allowing the host computer to be free to execute other computer tasks/jobs, such as word processing or email, in order to be most responsive to the user during the video operations;

(3) sending enough video encoding to the external hardware video encoder to keep it in continuous operation while there are further video frames to encode, thus obtaining fast encoding time while minimizing the use of the host computer; and (4) determining the relative video encoding speed of the two processors and distributing the video encoding load across the two processors so as to minimize the overall time to complete the video encoding.

In one embodiment, the user is provided with a software switch or other "button" to enable a turbo rendering mode. More particularly, when the user engages the "button" video encoding or other video operations can make use of the external video render processor in accordance with the various modes described. When the switch or "button" is turned off, the external processor capabilities are not available to the host operating system.

FIGS. 7A-B illustrate a system diagram employing different techniques for adjusting the encoding loads between the hardware and software encoders, in accordance with embodiments of the present invention. In FIG. 7A, the load manager 702 is configured to distribute the video encoding loads between the external video encoder 706 and the software encoder 710. Preferably, video segments destined for the external encoder 706 and the software encoder 710 are first directed respectively to memory buffers 704 and 708. In this embodiment, the load manager 702 is preferably configured in the software application running on the host computer, such as the host computer 214 illustrated in FIG. 6. Preferably, the load manager 702 is configured to respond to signals from the memory buffers 704 and 708, whether these signals be hardware signals or software signals, to evaluate the speed at which the buffers are being emptied, i.e., an indirect measure indicating an average encoding speed. This is one example of a metric used to enable the user to obtain optimal performance in the video encoding process. The scope of the invention is not so limited but rather is intended to extend to any and all techniques used to manage the encoding between a first and second video processor. Once the respective video segments have been encoded into the second format, preferably a software module 715 running on the host computer performs reassembly of the video segments into their proper sequence in the video file.

FIG. 7B illustrates an alternate configuration. Here the load manager 702 is configured to respond to signals 718 from the host computer's operating system 712. For example, the signals may indicate that the processor is needed for other tasks. More particularly, the processor of the host computer may be needed for (1) other video processing tasks, or alternatively (2) general computer tasks, as described in further detail above. Rather than being optimized solely for enhancing the speed of the video encoding, the overall system operation is optimized to enable the host computer's processor to be relieved of the resource-demanding video processing in favor of other demands placed on the computer system. Alternatively, load manager 702 may be programmed to offload the entire video encoding task to the external video encoder, thereby leaving the host processor to wait for other video processing or general demands to be directed to the processor. Preferably, the signal 718 is a feedback signal supplying information on the encoding operation and its buffers 704 and 708, available tasks on the host computer, processor usage and the status/usage of other host computer resources, that is used by the load manager to implement the preferred algorithm, whether it is to provide fasting encoding, best availability of the host processor, or a fastest rendering. Pursuant to the statement immediately above, the load manager in one embodiment ensures that the fastest processor's input buffer is always full, for fastest encoding speed. In another embodiment, for the best overall rendering speed, the buffer for the host computer's software encoder is set empty during those times when feedback signal 718 indicates the host computer can be performing other rendering operations and is otherwise filled so as to share the encoding load with the external video encoder. In yet another embodiment, the buffer for the host computer's software encoder is set empty during the entire rendering operation, so the host computer can be most responsive to the user's other tasks, for example word processing and email. These examples are intended to be illustrative and not limiting.

Although the illustrative example describes a software encoder coupled to an external video encoder over an external bus, the described techniques are equally applicable to other configurations. For example, turbo rendering may be accomplished by using multiple video encoders in parallel, each connected to a separate bus or even connected on the same bus.

The foregoing description describes several embodiments of a combined audio video device providing an external hardware device for connection to a host computer. While the embodiments describe details of the combined device in several operating modes, the invention is not so limited. The scope of the invention is intended to extend to combined audio video devices used in any applications where any of video and audio capture, audio processing, video and audio adapter functions, video transcoding in both software encoders and external hardware encoders, and USB or IEEE 1394 connectivity is used. By configuring audio and video devices in accordance with the embodiments described, efficient use of the external hardware is provided while simplifying the number of added devices coupled to a host computer.

In the preferred embodiment, video transcoding takes place between a first DV format and a second MPEG format. In other embodiments, transcoding between different MPEG profiles takes place. For example, a user can use the system and methods described to convert a DVD (MPEG 2) to a VCD (MPEG 1). Alternatively still, a user can convert raw video to any compressed format. Selected formats have been described herein for illustration purposes. It should be understood that the scope of the invention is not so limited but rather is intended to extend to the conversion from any video format to another or from any profile to another, that is, any video format presently existing or devised in the future. In a preferred embodiment, the video format conversion (transcoding) occurs non-synchronously; i.e. is not constrained to a real time clock. Data packets are preferably forwarded from the host computer to any of the external processors to allow transcoding or other video processing to occur as quickly as the processors' capabilities allow. Preferably this allows faster than real time processing. The scope of the invention is intended to extend also to real time video transcoding, wherein, for example, digital video originating in the NTSC format would be transcoded at 30 frames per second.

The video processing system may be simplified by eliminating audio and video inputs from video cameras, VCRs and other video equipment to the external video processor. The digital video encoder 210 illustrated in FIG. 6 may be coupled to the host computer 214 over the external bus solely for enhancing video processing of video packets received from the host computer 214. For example, a simplified video processing system 800 is illustrated in FIG. 8A. FIG. 8A is a system diagram illustrating external video processing enhancement in accordance with one embodiment of the present invention. In particular, the digital video encoder 210 provided is dedicated to providing measurable improvements in video rendering operations. The third processor 254 is shown connected to an external bus through a port on the PC 214 (which could be the same bus 242, or another bus) to further increase the video rendering efficiencies. That is, the third processor 254 performs operations in parallel with at least one of the digital video encoder 210 and the processor in the host computer 214. The scope of the invention is intended also to extend to the addition of any other additional processors connected preferably by the external bus but also to include parallelism afforded by other internal busses in the host computer. These parallel processors may be connected through external busses that employ hubs for multiple devices or with external busses that provide peer-to-peer connections without hubs (e.g., IEEE 1394 busses).

External video processing is not limited to increasing the speed of transcoding operations. That is, the scope of the invention is intended to extend to more general video processing performed in external video processors (i.e., render processors). For example, a render processor may be substituted for any of the video encoder chips 210 illustrated in FIGS. 2, 6, and 8A or the external encoder functionality illustrated in FIG. 7 and still be in keeping with the scope of the present invention.

FIG. 8B is a system diagram illustrating external video processing enhancement in accordance with another embodiment of the present invention. Here, the render processor 810 in the video processing system 800 can be a general purpose video processor or one dedicated to specific video processing operations. For example, the render processor may be configured to perform any single operation of render processing such as video encoding (e.g., MPEG encoding), video overlay processing and titling, transition processing, and video filter processing. In other embodiments, the render processor may be configured to perform any combination of these operations. By providing an external render processor as described, greater efficiencies can be achieved.

Normally the rendering operations would be performed in sequence by the host computer, resulting in undesirable performance in the following two situations. Firstly, for rendering that is performed so that the results of the user's editing can be displayed on the host computer in a "Preview" window, there is a lag from when the user instigates the Preview and when it can be displayed because these rendering operations must be "pre-computed" to provide a smooth Preview. In the embodiment of FIG. 8B, the external video processor can provide render processing in parallel with the host computer so that (i) the Preview operation can be started sooner, (ii) the edit operations that are to be displayed in the Preview window can be performed at greater resolution or quality, (iii) a greater frame size or frame rate can be displayed in the Preview, (iv) the Preview will be displayed without any dropped frames, hesitations, frame tears, (v) de-interlacing, color adjustments and/or other desirable video filtration operations can be performed, or any combination of the foregoing. Secondly, for rendering that is performed for the final output operation, for example (without limitation) burning the user's video project to a user distributable form like DVD, the external video processor can provide render processing in parallel with the host computer so that the host computer can perform operations such as DVD format preparation, audio video multiplexing, menu rendering, disc finalization and other rendering operations while the external video processor is performing operations in parallel, thereby minimizing the overall rendering time.

In addition, load balancing techniques as described above may be utilized to distribute the various video processing loads between the host computer, the external video render processor, and any additional processors. For a non limiting example, any of the video encoding, overlay processing, transition processing and filter processing operations may be distributed between the processors by using the manual or automatic load processing techniques described. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for processing video data, the system comprising:
a host computer; and
an external video render processor coupled to the host computer by a general purpose external bus; wherein the host computer and the external video render processor are configured to transmit the video data in a bi-directional manner between the host computer and the external video render processor over the general purpose external bus, the video data transmitted from a video file to the external video render processor for processing and the processed video data transmitted back to the host computer after processing; and wherein the host computer is further configured to perform internal video processing and to merge processed video data from the external video render processor and the video data processed internally.

2. The system as recited in claim 1 wherein the external video render processor is configured to perform video encoding.

3. The system as recited in claim 2 wherein the video data transmitted to the external video render processor is compressed into a DV format and wherein the video processing comprises transcoding from a DV format to an MPEG format.

4. The system as recited in claim 2 further comprising a third processor configured for encoding video in parallel with at least one of the host computer and the external video render processor.

5. The system as recited in claim 1 wherein the external bus is one of a USB bus and an IEEE 1394 bus.

6. The system as recited in claim 1 wherein the external bus is further configured to provide signal and power connections to at least a second peripheral device and wherein the second peripheral device is one of a DVD recorder, an external hard drive, a mouse, and a video camera.

7. The system as recited in claim 1 wherein video encoding is performed in both the external video render processor and in a software encoder of the host computer.

8. The system as recited in claim 1 wherein the system is configured to perform non real time encoding of the video file.

9. The system as recited in claim 1 wherein the external video render processor is configured to perform at least one of MPEG encoding, overlay processing and titling, transition processing, and filter processing.

10. The system as recited in claim 1 wherein the external video render processor is configured to perform a combination of at least two of the following operations: video encoding, overlay processing and titling, transition processing, and filter processing.

11. A method for processing video data in a system comprising a host computer and an external video render processor coupled to the host computer by a general purpose external bus, the method comprising:
   transmitting the video data in a bi-directional manner between the host computer and the external video render processor over the general purpose external bus, the video data transmitted from a video file to the external video render processor for processing and the processed video data transmitted back to the host computer after processing;
   performing video processing internally by the host computer; and
   merging the processed video data from the external video render processor and the video data processed internally by the host computer.

12. The method as recited in claim 11, wherein the general purpose external bus is one of a USB bus and an IEEE 1394 bus.

13. The method as recited in claim 11, wherein the video data processed internally is an edited video segment.

14. The method as recited in claim 11, further comprising:
   employing a user selected load distribution mode to distribute the video data between the host computer and the external video render processor.

15. The method as recited in claim 14, wherein the user selected load distribution mode comprises sending all of the video data to the external video processor for video processing.

16. The method as recited in claim 14, wherein the user selected load distribution mode comprises sending a first portion of the video data to the external video processor, and a second portion to a software video processor in the host computer, the first and second portions selected to optimize the render processing speed.

17. The method as recited in claim 14, wherein the external video render processor further comprises a second external video render processor.

* * * * *